(12) United States Patent
McAllister et al.

(10) Patent No.: US 7,858,681 B2
(45) Date of Patent: Dec. 28, 2010

(54) PRODUCT COMPRISING IONOMER AND PLASTICIZER

(75) Inventors: Kevin Patrick McAllister, Bear, DE (US); Elizabeth R. Griffin, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 389 days.

(21) Appl. No.: 11/894,418

(22) Filed: Aug. 21, 2007

(65) Prior Publication Data

US 2009/0054584 A1 Feb. 26, 2009

(51) Int. Cl.
*C08K 5/11* (2006.01)
(52) U.S. Cl. .................. 524/314; 428/515; 428/516; 428/518; 428/520; 428/522; 428/523; 524/500; 524/515; 524/522; 524/527
(58) Field of Classification Search .......... 524/500, 524/314, 515, 522, 527; 428/515, 516, 518, 428/520, 522, 523
See application file for complete search history.

(56) References Cited

U.S. PATENT DOCUMENTS

| | | | |
|---|---|---|---|
| 5,089,533 A | 2/1992 | Park | |
| 5,861,211 A | 1/1999 | Thakkar et al. | |
| 2003/0229160 A1 | 12/2003 | Williams | |
| 2007/0021566 A1 | 1/2007 | Tse | |

FOREIGN PATENT DOCUMENTS

| | | |
|---|---|---|
| JP | 62122753 A | 6/1987 |
| JP | 2004216773 A | 8/2004 |
| WO | 02090113 A1 | 11/2002 |

OTHER PUBLICATIONS

PCT International Search Report for International Application No. PCT/US2008/073414 dated Nov. 26, 2008.

*Primary Examiner*—Edward J Cain

(57) ABSTRACT

A product comprises or is produced from a substrate and optionally a thermal insulation wherein the substrate comprises or is produced from polyvinyl chloride and a liquid plasticizer; the substrate, the insulation material, or both is coated, laminated, coextruded, or applied with a barrier layer comprising an ionomer; and the substrate is in close proximity to the insulation material. Also disclosed is a process that can be used to prevent liquid plasticizer from migrating out of polyvinyl chloride product wherein the product is optionally in close proximity to a thermal insulation; the process comprises coating, laminating, coextruding, or applying a barrier layer disclosed above onto the surface, or a portion thereof, of the product or onto the insulation.

13 Claims, No Drawings

PRODUCT COMPRISING IONOMER AND PLASTICIZER

FIELD OF THE INVENTION

The invention relates to a composition comprising polyvinyl chloride, a plasticizer, and an ionomer, to a process for preventing leaking of plasticizer from a polyvinyl chloride comprising the plasticizer, and to a product for using the composition.

BACKGROUND OF THE INVENTION

Roofing products include shingle, metal, wood shake, clay tile, concrete tile, slate, or membrane. Each has its own limitations. Shingle roofing using asphalt in the base is common, inexpensive, and has two layers of shingles over the entire roof area. Metal roofing is made up of various types of metals such as steel, aluminum, and copper. Wood shake roofing, desired for its look but not durability, absorbs water creating moisture and can be flammable. Concrete tile and clay tile are heavy in weight. Slate roofing can be expensive and the tile may shatter around a nail hole.

Membrane roofing is generally used on flat or nearly flat roofs to prevent leaks and move water off the roof. Membrane roofs are most commonly made from synthetic rubber, thermoplastic polymers such as polyvinyl chloride (PVC) and thermoplastic polyolefin, or modified bitumen. Roofing membrane may replace asphalt roof systems or an older, less effective type of flat roofing system. Membrane roofs become more common in residential application, but are more commonly used in commercial application.

Roofing membranes are fabricated from strong, flexible, waterproof materials. They may be applied in multiple layers may consist of a single-ply membrane. Membranes usually contain a fabric made from felt, fiberglass, or polyester, for strength, which is laminated to or impregnated with a flexible polymeric material. The polymeric material may include bituminous hydrocarbon materials such as asphalt, to synthetic rubber (e.g., EPDM), or PVC. The color of the polymer itself ranges from black to white, often depending on the amount of coloring agent (e.g., carbon black) present.

PVC is mixed with one or more heat stabilizers, lubricants, plasticizers, fillers, or other additives to make more processable, all of which can influence its physical and mechanical properties.

Adding insulation makes a building more energy efficient and acts as a sound absorber or barrier, keeping noise levels down. Insulation includes use of blankets, loose-fill, or rigid systems with materials such as rock wool, fiber glass, cellulose, polyurethane foam, extruded polystyrene foam, expanded polystyrene foam, polyurethane foam, polyisocyanurate foam, or combinations of two or more thereof. Such insulating material is often used together with roofing membranes using PVC.

Frequently, a plasticizer in PVC migrates or leaks out thereby rendering the foam ineffective or less effective. It is therefore desirable to prevent liquid plasticizer in PVC roofing membranes from migrating into insulation.

SUMMARY OF THE INVENTION

A composition or product comprises or is produced from polyvinyl chloride, a liquid plasticizer, and an ionomer.

A product comprises or is produced from a substrate and optionally a thermal insulation material wherein the substrate comprises or is produced from polyvinyl chloride and a liquid plasticizer; the substrate, the insulation material, or both is coated, laminated, coextruded, or applied with a barrier layer comprising an ionomer; and the substrate is in close proximity to the insulation material.

A process that can be used to prevent liquid plasticizer from migrating out of polyvinyl chloride product wherein the product is optionally in close proximity to a thermal insulation material; the process comprises coating, laminating, coextruding, or applying a barrier layer onto the surface, or a portion thereof, of the product or onto the insulation material; and the barrier layer comprises or is produced from an ionomer.

DETAILED DESCRIPTION OF THE INVENTION

PVC is a widely available and used thermoplastic polymer. As a hard plastic, PVC can be made softer and more flexible by adding a plasticizer.

Plasticizers that can be used with PVC include phthalate-based plasticizers, adipate-based plasticizers, trimellitates, maleates, sebacates, benzoatesm epoxidized oils, sulfonamides, organophosphates, or polyethers, A phthalate-based plasticizer is frequently used with PVC and can include butyl octyl phthalate, hexyl decyl phthalate, di-n-hexyl azelate, dibutyl phthalate, dibutoxy ethyl phthalate, butyl benzyl phthalate, butyl octyl phthalate, dihexyl phthalate, dioctyl phthalate, diisooctyl phthalate, dicapryl phthalate, dicapryldioctyl phthalate, diisononyl phthalate, diisodecyl phthalate, ditridecyl phthalate, any plasticizer known to one skilled in the art of flexible PVC, or combinations of two or more thereof.

The compositions can additionally comprise additives used in polymer compositions including heat stabilizer, viscosity stabilizer, hydrolytic stabilizer, antioxidant, UV stabilizer, anti-static agent, dye, pigment or other coloring agent, inorganic filler, fire-retardant, lubricant, reinforcing agent such as glass fiber and flakes, foaming or blowing agent, processing aid, delustrant such as $TiO_2$, antiblock agent, release agent, or combinations of two or more thereof.

Inorganic filler comprises particles of inorganic compounds, such as minerals and salts such as $CaCO_3$.

Foaming or blowing agents known to one skilled in the art can be incorporated to reduce the density of the PVC composition and also to size the product to the required dimensions in an extrusion process. Examples of solid blowing agents include monosodium citrate, sodium bicarbonate, or combinations thereof.

Heat stabilizer includes a calcium/phosphate derivative of a hindered phenol sold under the trademark RECY-CLOSTAB 411 (calcium phosphate) by Ciba-Geigy Chemicals (Tarrytown, N.Y.). The heat stabilizer can also be one or more hydroxyamines, phenols, phosphates, and metal soaps. In the case where the thermoplastic polymer of the composite is polyvinyl chloride or polyvinyl chloride copolymer, conventional polyvinyl chloride stabilizers, well known in the art, may also be used.

Antioxidant includes alkylated phenols and bis-phenols such as hindered phenols, polyphenols, thio and di-thio polyalkylated phenols, lactones such as 3-arylbenzofuran-2-one and hydroxyl-amine as well as Vitamin E.

Reinforcing agent such as glass fiber, polyester fabric, scrim, coated fabric, and flakes can be used to improve flex modulus of the PVC composition.

For every 100 parts of PVC by weight, the plasticizer can be present in the composition in the range of from about 30 to about 150, about 45 to about 125 or about 60 to about 100 parts and one or more additives can be presenting the composition from about 1 to about 50, about 2 to about 25, or about 3 to about 10 parts.

An ionomer can be produced by any means known to one skilled in the art such as by neutralizing an ethylene acid copolymer with one or more metal ions. An ethylene acid copolymer is a polymer comprising repeat units derived from ethylene and about 1 to about 50%, or about 5 to about 40%, or 10 to 25%, by weight of a comonomer such as acrylic acid, methacrylic acid, ethacrylic acid, or combinations of two or more thereof, based on the total weight of the ethylene copolymer. Ionomer is well known to one skilled in the art (see e.g., U.S. Pat. No. 3,264,272) and the description of which is omitted for the interest of brevity.

An ethylene acid copolymer may comprise up to 35 wt % of an optional comonomer such as carbon monoxide, sulfur dioxide, acrylonitrile, maleic anhydride, maleic acid diesters, maleic acid, maleic acid monoesters, itaconic acid, fumaric acid, fumaric acid monoester, a salt of these acids, glycidyl acrylate, glycidyl methacrylate, and glycidyl vinyl ether, methyl acrylate, ethyl acrylate, isopropyl acrylate, butyl acrylate, pentyl acrylate, methyl methacrylate, ethyl methacrylate, propyl methacrylate and butyl methacrylate, pentyl methacrylate, or combinations of two or more thereof where the alky group can be linear or branched.

The neutralization, for example, can range from about 0.1 to about 100, or about 10 to about 90, or about 20 to about 80, or about 20 to about 40 percent, based on the total carboxylic acid content, with a metallic ion. The metallic ions can be monovalent, divalent, trivalent, multivalent, or combinations of two or more thereof. Examples include Li, Na, Ag, Hg, Cu, Be, Mg, Ca, Sr, Ba, Cd, Sn, Pb, Fe, Co, Zn, Ni, Al, Sc, Hf, Ti, Zr, Ce, and combinations of two or more thereof. If the metallic ion is multivalent, a complexing agent, such as stearate, oleate, salicylate, and phenolate radicals can be included, as disclosed in U.S. Pat. No. 3,404,134. Frequently used ions include Na, Zn, or combinations thereof. Of interest here is an ionomer that is neutralized with sodium or zinc ions such as NaOH, $NaHCO_3$, $Na_2CO_3$, $NaHSO_4$, $NaH_2PO_4$, $Na_2HPO_3$, sodium stearate, sodium oleate, sodium salicylate, sodium phenolate, $Zn(OH)_2$, $ZnCO_3$, $ZnCO_3$, $ZnSO_4$, $ZnHPO_4$, $ZnHPO_3$, zinc oxide, zinc stearate, zinc oleate, zinc salicylate, zinc phenolate, $Mg(OH)_2$, $MgCO_3$, $MgCO_3$, $MgSO_4$, $MgHPO_4$, $MgHPO_3$, magnesium stearate, magnesium oleate, magnesium salicylate, magnesium phenolate, or combinations of two or more thereof.

The ionomer can be a blend of an ionomer having greater than 20% neutralization and, for example, a second ethylene acid copolymer to achieve the desired degree of neutralization. For example, the ionomer can comprise about 1 to about 50, about 5 to about 40, or about 10 to about 25 weight % of an acid copolymer disclosed above.

The ionomer can also be a blend of an ionomer and about 1 to about 50 weight % of an ethylene alkyl (meth)acrylate copolymer. Examples of such alkyl (meth)acrylate include methyl acrylate, ethyl acrylate, methyl methacrylate, ethyl methacrylate, propyl acrylate, propyl methacrylate, butyl acrylate, butyl methacrylate, 2-ethylhexyl acrylate, 2-ethylhexyl methacrylate, lauryl acrylate, lauryl methacrylate, 2-hydroxyethyl acrylate, 2-hydroxyethyl methacrylate, glycidyl acrylate, glycidyl methacrylate, as well as one or more of those alkylacrylates disclosed above, or combinations of two or more thereof.

For example, an ethylene alkyl acrylate copolymer can comprise from 1 to 30 weight % of at least one E/X/Y copolymer wherein E comprises ethylene; X is a monomer selected from the group consisting of vinyl acetate and alkyl (meth) acrylic esters; and Y is one or more optional comonomers disclosed above; X is from 0 to 50 weight % of the E/X/Y copolymer, Y is from 0 to 35 weight % of the E/X/Y copolymer, wherein the weight % of X and Y cannot both be 0, and E being the remainder.

The ionomer can also be a blend of the ionomer and a copolymer comprising repeat units derived from ethylene, about 4 to about 30 weight % of a vinyl alkanoate or an ester including alkyl (meth) acrylate, and about 0.5 to about 20 weight % of an unsaturated monocarboxylic acid including (meth)acrylic acid. Such copolymers include ethylene acrylate copolymer comprising copolymer having repeat units derived from ethylene, vinyl acetate, and methacrylic acid or from ethylene, alkyl acrylate, and acrylic acid. See, e.g., U.S. Pat. No. 4,346,196 and U.S. Pat. No. 4,469,754 (entire disclosures are incorporated herein by reference).

Examples of commercially available ethylene acid copolymer includes Nucrel®; ionomer includes Surlyn® disclosed above; ethylene copolymer includes Appeel® and Elvaloy®, all from DuPont.

The processes for producing an ethylene acid copolymer and ethylene alkylacrylate copolymer are well known to one skilled in the art and the description of which is omitted herein for the interest of brevity.

The compositions can be formed into shaped article such as roofing membranes by injection molding, compression molding, overmolding, or extrusion. The compositions can be cut, injection molded, compression molded, overmolded, laminated, extruded, or milled to produce commercially usable products such as decorative moldings inside or outside of a house, railroad ties, picture frames, furniture, porch decks, railings, window moldings, window components, door components, roofing membranes, sidings, roofing applications or other types of structural members.

Alternatively, the ionomer can be made a film on the surface of or a portion of the surface of a PVC composition comprising a liquid plasticizer. For example, ionomer film can be layered on the surface of a PVC roofing membrane. The film layer can be about 5 to about 250, about 10 to about 150, or about 15 to about 150µ thick.

The ionomer layer can also be one layer of a multilayer structure that may comprise at least one layer comprising or produced from any other polymer such as the well known polyolefin including particle board, polyethylene, polypropylene, ethylene or propylene copolymer, polyamide, polyester, ethylene alkyl (meth)acrylate copolymer, ethylene acid copolymer, vinyl acetate copolymer, polyvinyl alcohol, polyvinylidene chloride, or combinations of two or more thereof. A multilayer film can include up to 10 or more layers each layer can be the same thickness as the ionomer layer.

Appropriate amounts, such as about 0.001 to about 10 weight %, of one or more additives can be present in layer(s) including those disclosed above.

A film (including multilayer film) can be made from the composition by melt-processing using known processes such as, coating, brushing, dipping, spraying, co-extrusion, sheet extrusion, extrusion casting, extrusion coating, thermal lamination, blown film methods, powder coating and sintering, or any known processes.

Because the processes for making films are well known to one skilled in the art, the description is omitted herein for the interest of brevity.

A product can comprise or be produced from a substrate coated, laminated, coextruded, or applied with a barrier layer comprising an ionomer. The substrate, such as a PVC roofing membrane, can comprise a liquid plasticizer and optionally one or more additives disclosed above. The substrate can have its surface or a portion thereof covered with a film layer of the ionomer, optionally with additional layer(s) disclosed above, and an insulation layer that is in close proximity with the ionomer layer. Close proximity means that there is no measurable distance, or a distance that is about 0.001 to about 50 or about 0.01 to about 20 mm, between the insulation layer and the ionomer layer.

The insulation layer can be any insulation composition known in the art including rock wool, fiber glass, cellulose, polyurethane foam, extruded polystyrene foam, expanded polystyrene foam, polyurethane foam, polyisocyanurate foam, or combinations of two or more thereof.

The product can be produced by layering a film on the substrate surface, or a portion thereof as disclosed above. The film can have a thickness as disclosed above.

A process that can be used to prevent liquid plasticizer from migrating out of polyvinyl chloride composition comprises applying a barrier layer onto the surface, or a portion thereof, of the composition wherein the barrier layer comprises or is produced from an ionomer. The composition and the process for producing the composition and the ionomer can be the same as those disclosed above. The barrier layer can be the same as the ionomer film and the process, therefore disclosed above.

EXAMPLES

Example 1

Four, 5"×7" (12.7 cm×17.8 cm), 2 mil Surlyn® films, obtained from DuPont, were suspended over blotter paper. With a 1 inch brush, the films were saturated on 4"×5" (10.2 cm×12.7 cm) are with diisononyl phthalate (DINP) for 24 hours at room temperature (about 25° C.). After 24 hours there were no signs of film degradation, film weakness or blotter paper stains. This was considered the control run.

Tests were again carried out the same way as the control run, except that the test lasted for 1 week. After 1 week, there were no signs of film degradation, film weakness or blotter paper stains.

The Surlyn® films tested were Surlyn® 1706 (zinc ionomer; 0.7 MI (melt index)); Surlyn® 1707 (sodium ionomer; 0.9 MI); Surlyn® 1650 (zinc ionomer; 1.6 MI); and Surlyn® 1605 (sodium ionomer; 2.8 MI).

Example 2

Pieces of commercially available 4"×2"×3" polystyrene foam insulation were staged on a cookie sheet. A Surlyn® ionomer barrier film that was exposed to 10 drops of DINP covered each foam piece; each setup was then topped with a piece of glass. Samples were cured in the over at 50° C. for 72 hours. After 72 hours there were no signs of film or foam degradation. Nor was there sign of film weakness. However, simultaneous tests with polystyrene foams without a barrier layer of Surlyn® ionomer film, there was apparent foam degradation.

Example 3

Tests were carried out in the same way in Example 2, except that the tests were continued for an additional 3 weeks. After 3 additional weeks of testing, there were no signed of film or foam degradation nor film weakness.

Example 4

Tests were carried out in the same way as in Example 2, except that the Surlyn® ionomer barrier film was exposed to liquid plasticized PVC membranes. After 3 weeks of testing, there were no sign of film or foam degradation nor film weakness. However, simultaneous tests with polystyrene foams without a barrier layer of Surlyn® ionomer film, there was apparent foam degradation.

The invention claimed is:

1. A product comprising or produced from a substrate and a thermal insulation wherein the substrate comprises or is produced from polyvinyl chloride and a liquid plasticizer; the surface or a portion of the surface of the substrate, the insulation, or both is coated, laminated, coextruded, or applied with a barrier layer comprising an ionomer; the substrate is in close proximity to the insulation; and the insulation is extruded polystyrene foam or expanded polystyrene foam.

2. The product of claim 1 wherein the substrate comprises the polyvinyl chloride and the plasticizer includes butyl octyl phthalate, hexyl decyl phthalate, di-n-hexyl azelate, dibutyl phthalate, dibutoxy ethyl phthalate, butyl benzyl phthalate, butyl octyl phthalate, dihexyl phthalate, dioctyl phthalate, diisooctyl phthalate, dicapryl phthalate, dicapryldioctyl phthalate, diisononyl phthalate, diisodecyl phthalate, ditridecyl phthalate, or combinations of two or more thereof.

3. The product of claim 2 wherein the ionomer is derived from an ethylene acid copolymer neutralized with one or more metal ions.

4. The product of claim 2 wherein the ionomer is a film layer coated on the substrate.

5. The product of claim 2 wherein the ionomer is a film layer coated on the insulation.

6. The product of claim 3 wherein the ionomer is a blend of the ionomer and a copolymer comprising repeat units derived from ethylene, a vinyl alkanoate or its ester, and about an unsaturated monocarboxylic acid.

7. The product of claim 4 wherein the ionomer is a film layer coated on the insulation.

8. A process comprising coating, laminating, coextruding, or applying a barrier layer onto the surface, or a portion thereof, of a product wherein the product comprises or is produced from polyvinyl chloride and a liquid plasticizer; the product is in close proximity to a thermal insulation; the process optionally comprises coating, laminating, coextruding, or applying the barrier layer onto the surface, or onto a portion thereof, of the insulation; the barrier layer comprises or is produced from an ionomer; and the insulation is extruded polystyrene foam or expanded polystyrene foam.

9. The product of claim 1 wherein ionomer is derived from an ethylene acid copolymer neutralized with one or more metal ions.

10. The process of claim 8 wherein the substrate comprises the polyvinyl chloride and the plasticizer includes butyl octyl phthalate, hexyl decyl phthalate, di-n-hexyl azelate, dibutyl phthalate, dibutoxy ethyl phthalate, butyl benzyl phthalate, butyl octyl phthalate, dihexyl phthalate, dioctyl phthalate, diisooctyl phthalate, dicapryl phthalate, dicapryldioctyl phthalate, diisononyl phthalate, diisodecyl phthalate, ditridecyl phthalate, or combinations of two or more thereof.

11. The process of claim 10 wherein the product ionomer is a blend of the ionomer and a copolymer comprising repeat units derived from ethylene, a vinyl alkanoate or its ester, and about an unsaturated monocarboxylic acid.

12. The process of claim 10 wherein the ionomer is a film layer coated on the substrate.

13. The process of claim 10 wherein the ionomer is a film layer coated on the insulation.

* * * * *